United States Patent Office 3,161,753
Patented Dec. 15, 1964

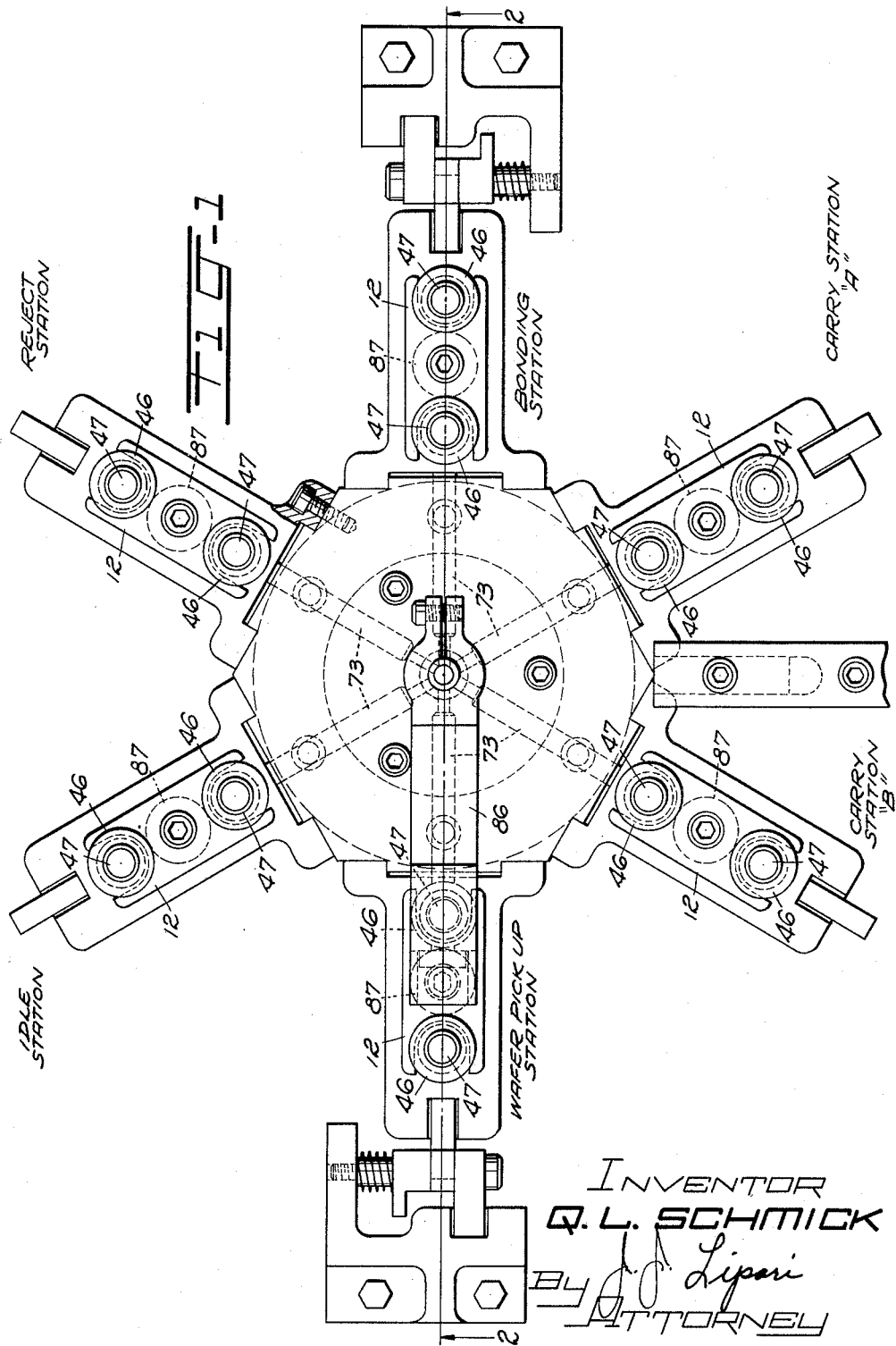

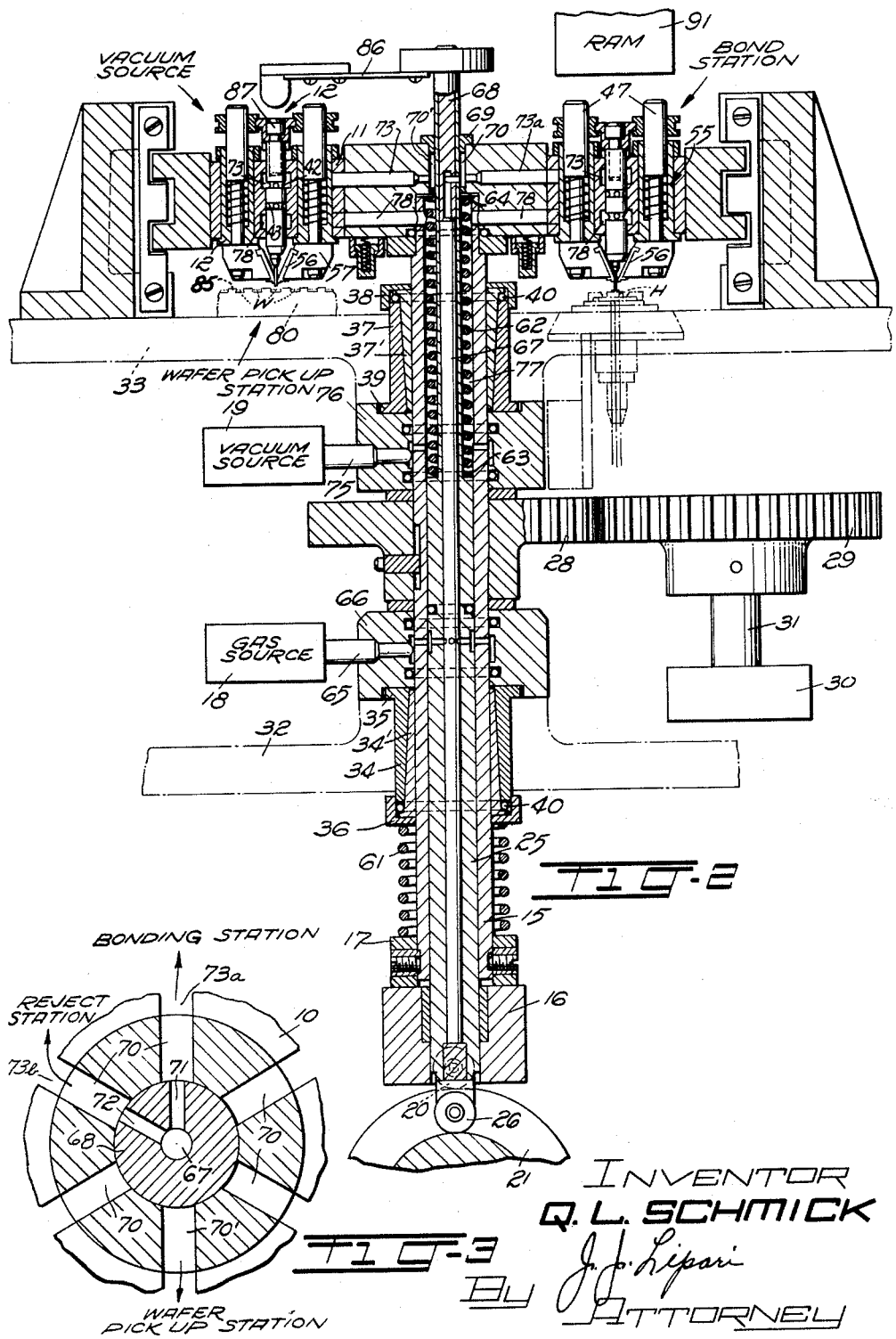

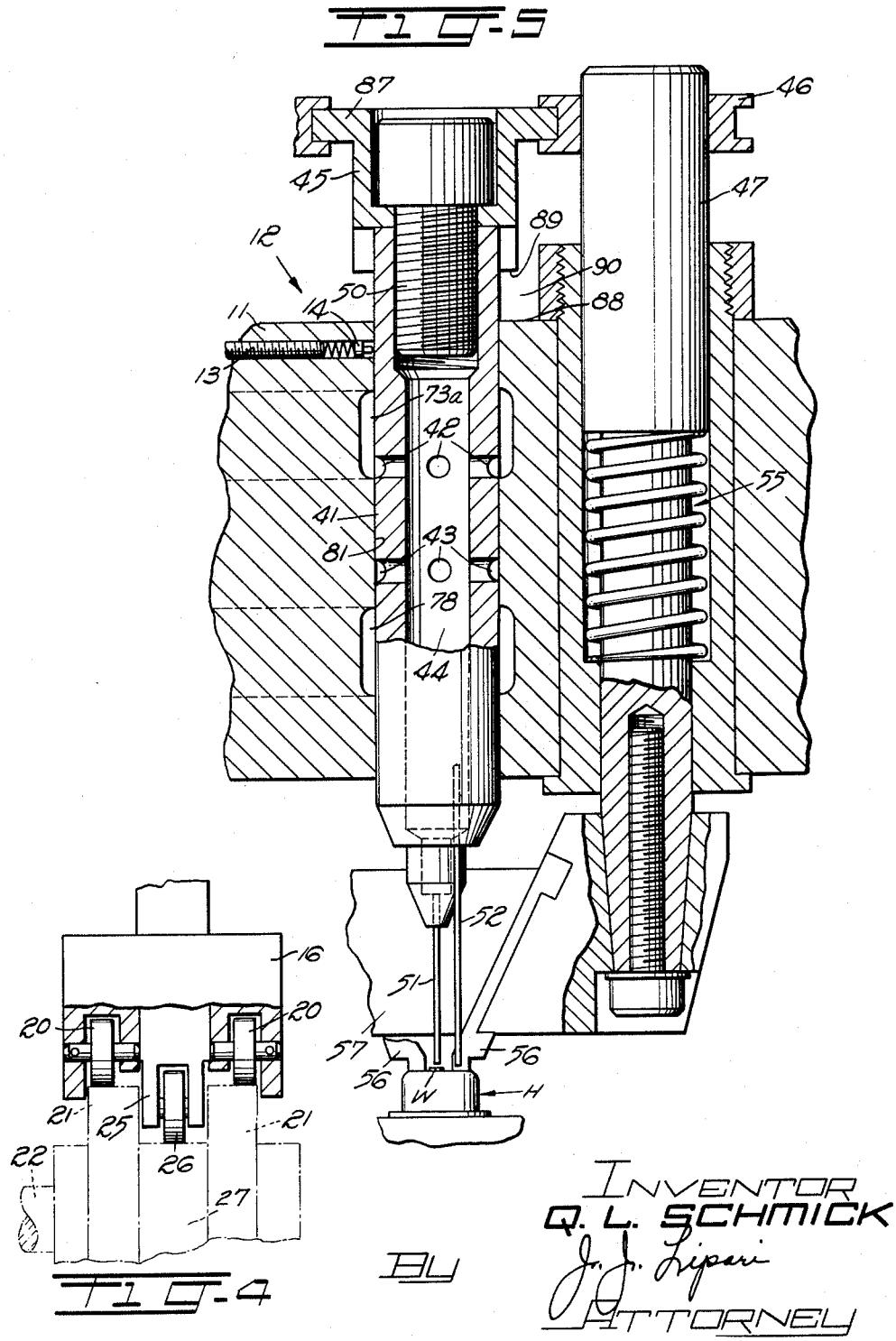

3,161,753
ARTICLE TRANSFER APPARATUS
Quentin L. Schmick, Wyomissing, Pa., assignor to Western Electric Company, Incorporated, New York, N.Y., a corporation of New York
Filed Jan. 22, 1962, Ser. No. 167,610
5 Claims. (Cl. 219—79)

This invention relates to transfer apparatus and particularly to a transfer apparatus for picking up an article at one area and transferring it to another area.

In the assembly of certain articles, such as transistors, a relatively small, thin semiconductor wafer is located on the top surface of a header and bonded thereto. Since this operation when performed manually is tedious and costly, automatic assembly becomes necessary and profitable for large scale production.

The object of this invention is an apparatus for automatically transferring an article from one area to another area.

Another object of this invention is an apparatus having a unit capable of permitting a vacuum force therein for picking up a semiconductor wafer at a loading area and transferring the wafer to a bonding area whereupon a forced gas is passed through the unit to discharge the wafer upon a transistor header.

Broadly, the invention includes a sleeve body disposed within a housing, the body having first and second ports extending through its wall. A first and second passage extends through the housing, one end of each passage being disposed adjacent to the sleeve wall. The other end of the first passage communicates with a suction means while the other end of the second passage communicates with a pressurized gas means. Relative movement is provided between the sleeve and housing in such a manner that when the first port registers with the first passage, the second port is blocked from the second passage by the wall housing thereby permitting suction through said first passage and sleeve to pick up the article, and when the second port registers with the second passage, the first port is blocked from communicating with the first passage by the housing wall thereby permitting the gas to flow through the sleeve to remove the article therefrom.

In a preferred embodiment, the apparatus includes an inner shaft extending through an outer shaft which is connected to a turret having a first passage communicating with a suction means, and a second passage communicating with a pressurized gas means. A plurality of sleeve-like units are disposed within the turret adjacent to one end of the passages, the units having first and second ports extending through their sleeve wall. Independent means are provided for moving the turret and inner shaft between raised and lowered positions. After a unit is indexed over a wafer, the inner shaft is caused to remain at its lowered position while the turret is moved to its raised position. In turn, the second port is blocked from the second passage by the turret wall and the first port registers with the first passage to permit suction to pass through the sleeve to pick up the wafer. The turret is then rotated to a bonding station such that the loaded sleeve unit is oriented over a header. The turret, having a pair of spring-loaded electrodes, and the sleeve descend towards their lowered positions, the electrodes engaging the header and applying heat thereto. The sleeve then locates the wafer on the header and remains static as the wafer is bonded to the header and the turret continues to its lowered position. At the lowered position, the first passage is blocked from the first port, and the second passage communicates with the second port to permit the flow of gas under pressure through the sleeve to remove the wafer from the sleeve and to cool the bonding area.

Other objects will be apparent and a fuller understanding of the invention may be had by referring to the following description and claims, taken in conjunction with the accompanying drawing, in which:

FIG. 1 is a plan view of the apparatus embodying the present invention;

FIG. 2 is a sectional view taken along the line 2—2 of FIG. 1;

FIG. 3 is a schematic view illustrating the flow of a forced gas from an inner shaft opening leading to a needle unit;

FIG. 4 is an end view of cam means for vertically moving an inner and an outer shaft; and FIG. 5 is an enlarged sectional view of the needle unit in a raised position at the bonding station.

With reference to the drawing, the invention is incorporated in a turret 10 having a plurality of head portions 11 connected thereto. A needle unit, generally referred to as 12, is provided in each head portion 11 and is capable of movement therein or remaining in a fixed position by a threaded detent 13, as seen in FIG. 5. The detent is provided with a spring-loaded tip 14 which engages and creates a friction on sleeve 41 of needle unit 12 at all times, the desired amount of friction for holding the unit in a static position being adjustably controlled by the threaded movement of the detent.

An outer shaft 15 is connected at one end to the central portion of turret 10, and is held thereagainst by a collar 16. As seen in FIG. 4, a pair of cam followers 20 are rotatably attached to collar 16 for relative travel with cams 21 which are driven by a cam shaft 22 for vertically moving the turret between raised and lowered positions.

An inner shaft 25 extends within outer shaft 15 and through collar 16. A cam follower 26 is provided at the bottom end of shaft 25 for relative travel with cam 27 for vertically moving the inner shaft within outer shaft 15. A gear 28 is affixed to outer shaft 15 and is in mesh with a gear 29 which is driven by a motor unit 30 through a drive shaft 31 for intermittently rotating the turret.

Shaft 15 extends through and is slidable within a base 32 and support 33. A take-up bushing, consisting of members 34, 34′, is provided within base 32 and secured therein by a flanged end portion 35 of member 34 and a locking element 36. Similarly, another take-up bushing, consisting of members 37, 37′, is secured within support 33 by a flanged end portion 38 of member 37 and a locking element 39. An O ring 40 is disposed within each of the bushings for adjustment of the members to compensate for wear. A compression spring 61 is provided between locking elements 17 and 36 for facilitating the vertical movement of shaft 15. Similarly, another compression spring 62 is provided between an indented portion 63 of shaft 25 and a section 64 of turret 10 for permitting a smooth, vertical movement of shaft 25.

As seen in FIGS. 2 and 5, needle unit 12 is provided with a sleeve 41 having a plurality of radially spaced air ports 42 and vacuum ports 43, the ports extending transversely through the sleeve and into a channel 44 extending longitudinally therethrough. A cap 45 is connected to sleeve 41 by a threaded member 50 which also seals the top end of channel 44, the cap 45 being connected to a ring member 46 slidable along electrode cover 47. A tubular needle-like member 51 extends from the bottom end of channel 44, and a stop pin 52 extends in parallel relationship with and terminates in the same plane as needle 51. A pair of spring-loaded electrode elements 55 extend through head 11 and are fixedly located in parallel relationship to and on either side of needle unit 12. A welding tip 56 extends angularly from the bottom of each element 55 in contacting relationship with a header H for transferring sufficient heat thereto during the wafer bonding operation at the bonding station. A tie bar 57, of insulating material, connects the two electrode tips to maintain electrode orientation.

A gas, such as forced air or a forming gas comprising hydrogen and nitrogen for preventing oxidation at the bonding station, is passed through needle channel 44 from a suitable, conventional source 18 through a vent 65 extending through bearing end cap 66, outer shaft 15 and inner shaft opening 67, the latter being sealed by a blocking top end portion 68. As seen in FIGS. 2 and 3, a bushing 69, located between inner shaft 25 and turret 10, is provided with a plurality of slots 70 radially spaced therethrough. A plurality of air passages 73, each communicating with a bushing slot 70, extends through turret 10 and head 11 to permit the forced air passing from the bushing slots 70 into needle sleeve ports 42 when the latter is in registry therewith, as described in more detail hereinafter.

A vacuum is created in needle channel 44 from a suitable, conventional suction source 19 connected to a vent 75 which extends through an annular ring 76 and outer shaft 15. The vent leads into an orifice 77 extending between outer shaft 15 and inner shaft 25, the orifice being formed between a reduced diameter portion of inner shaft 25 and outer shaft 15. A plurality of vacuum passages 78, each having one end in communication with orifice 77, extends through turret 10 and head 11 thereby permitting a suction through needle channel 44 when the sleeve vacuum ports 43 are in registry therewith, as described in more detail hereinafter.

In operation, the turret is indexed by motor 30 through gears 29 and 28 to a position such, as seen in FIG. 2, that a needle unit 12 is located at the pick-up station in a raised position ready to pick up a wafer W from tray 80, and another needle unit, having already picked up a wafer, is located at the bonding station in a raised position over a header H ready to place a wafer thereon. However, in order to simplify the operation, the movement at the wafer pick-up station will first be described.

As seen in FIGS. 2, 3 and 5, the relative position of air ports 42 and vacuum ports 43 of sleeve 41 with respect to passages 73 and 78, at the wafer pick-up station, is such that the air ports communicate with passage 73 but do not receive any air therefrom since top end portion 68 blocks the passage of air from opening 67 through bushing slot 70'. Conversely, the vacuum ports do not communicate with vacuum passage 78 since they are blocked by wall 81 of head 11 thereby preventing any suction within needle channel 44.

Turret 10 is lowered by the action of cams 21 to position needle 51 directly over and very near to an accurately located wafer, stop pin 52 striking a projecting portion 85 of tray 80 to insure that needle 51 does not contact and cause injury to the wafer. Inner shaft 25 is then lowered by cam 27 to a position such that a laterally extending arm 86, connected to the top end portion 68 of shaft 25, engages the top surface 87 of cap 45. Arm 86 remains in this position to prevent any movement of needle unit 12 as the turret is next moved to its raised position. In moving the turret to its raised position, head wall 81 slides along the now static sleeve 41 until the top surface 88 of head 11 engages the bottom surface 89 of cap 45 thereby closing the normally open gap 90 therebetween. At this point, vacuum passage 78 registers with vacuum port 43 thereby permitting suction therethrough to the sleeve which lifts the wafer against needle 51, the air ports 42 now being blocked by head wall 81. Turret 10 and inner shaft 25 then are lifted simultaneously through their respective cams 21 and 27. After turret 10 has reached a desired height, arm 86 continues to rise and moves from the top surface 87 of cap 45 to its raised position.

The turret is twice indexed through carry stations B and A prior to being indexed to the bonding station. When unit 12 is positioned over a header H, previously indexed by any conventional means (not shown), a ram 91 strikes electrode covers 47 to move the welding electrode tips 56 into contact with the header whereupon heat is applied to the header. The turret is then moved downwardly and, in so doing, needle 51 descends therewith to a distance just short of the header, the needle retaining the wafer for a predetermined time so that radiated heat may be transmitted from the header H to the wafer W to prevent any thermo shock to the wafer. The turret then continues to lower to a point whereupon the wafer engages the header, the initial impact of the wafer causing the formation of a eutectic to initiate the bonding. During the bonding of the wafer, the turret continues to descend thereby restoring the gap 90 between the top surface 88 of head 11 and the bottom surface 89 of cap 45. As this occurs, however, sleeve vacuum ports 43 are blocked by head wall 81 to cut off suction thereto, and one end of air passage 73a communicates with the sleeve air ports 42. The other end of passage 73a communicates with a bushing slot 70 in registry with an opening 71 (FIG. 3) extending through the top end portion 68 which seals the inner shaft opening 67. Since inner shaft 25 is movable solely in a vertical manner, opening 71 communicates with passage 73a only at the bond station to permit forced air to pass therethrough and into channel 44 and needle 51. The forced air passing through the needle not only releases the wafer therefrom but also cools the top of the wafer to prevent the metallic elements (not shown) on its top surface from further diffusing into the wafer body.

The bonding turret is then returned to its normal raised position, the electrodes returning independently therewith. The turret is then indexed to the next station, as seen in FIG. 1, a reject station, whereupon a wafer, which may not have been deposited at the bonding station can be ejected from the needle 51. As seen in FIG. 3, the top end portion 68 of inner shaft 25 is provided with another opening 72 which communicates only with the bushing slot 70 oriented with the reject station. Thus, at the reject station, upon the start of another cycle, i.e., as the turret moves through to its lowered position, air passage 73b communicates with bushing slot 70 in registry with opening 72 to permit forced air to pass from opening 67 therethrough and through needle 51 to eject a wafer that may not have been bonded at the previous station. The turret continues to descend to its lowered position as it cycles through another operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. An article transfer apparatus which comprises:
   a hollow, outer shaft;
   a turret connected to said outer shaft and having first and second passages extending therethrough;
   a plurality of sleeve-like units mounted for axial movement within the turret, each of said sleeve-like units having porting means extending through the sleeve wall and being arranged to connect said first and second passages alternately to the interior of the sleeve-like unit dependent upon the axial position of the unit relative to the turret;
   an inner shaft extending through the outer shaft and arranged for axial reciprocation relative to the outer shaft, said inner shaft and outer shaft having a channel disposed therebetween communicating with the one of the first and second passages in the turret and said inner shaft having a channel extending therethrough communicating with the other of said first and second passages in the turret;

means for drawing a vacuum through the one of said channels;

means for supplying gas under pressure through the other of said channels;

means for moving the turret between a raised position and a lowered position;

means for moving the inner shaft between a raised and lowered position;

an arm extending radially from the inner shaft for engaging one of the sleeve-like units when the inner shaft is in its lowered position and holding the engaged sleeve-like unit stationary during movement of the turret to its raised position, said last-mentioned movement causing relative movement between said engaged sleeve-like unit and the turret to connect said porting means to said vacuum drawing means through the one of said first and second passages communicating therewith.

2. Apparatus according to claim 1 having means for indexing the turret and positioning the sleeve-like unit and an article held thereon by differential pressures at a predetermined discharge location over an element designed to receive the article so that as the turret and sleeve-like unit are moved downwardly by the means for moving the turret between a raised position and a lowered position the article on the sleeve-like unit is moved into engagement with the element to prevent further downward movement of the sleeve-like unit, thereby causing the sleeve-like unit to remain static as the turret continues to a lower position which, in turn, disconnects the means for drawing a vacuum from the porting means and connects the means for supplying gas under pressure to the porting means to remove the article from the sleeve-like unit when the turret is moved to a raised position.

3. Apparatus according to claim 2 wherein the inner shaft has an opening extending laterally therethrough and communicating with one of the passages at the discharge location when the turret is at the lowered position for permitting the gas to flow through said last-mentioned passage to the sleeve-like unit.

4. Apparatus according to claim 2 wherein electrode means are disposed within the turret for applying heat to the element to bond the article thereto as the turret moves to its lowered position.

5. An article transfer apparatus which comprises:

a turret having first and second passages extending therethrough;

a sleeve-like unit mounted for axial movement within the turret, said sleeve-like unit having porting means extending through the sleeve wall and being arranged to connect said first and second passages alternately to the interior of the sleeve-like unit dependent upon the axial position of the unit relative to the turret;

means for drawing a vacuum through the one of said passages;

means for supplying gas under pressure through the other of said passages;

means for moving the turret between a raised position and a lowered position;

means for moving the sleeve-like unit between a raised and lowered position; and an arm for engaging and holding the sleeve-like unit stationary during movement of the turret to its raised position, said last-mentioned movement causing relative movement between said sleeve-like unit and the turret to connect said porting means to said vacuum drawing means through the one of said first and second passages communicating therewith.

References Cited in the file of this patent
UNITED STATES PATENTS

| | | |
|---|---|---|
| 2,371,128 | Costa | Mar. 13, 1945 |
| 2,380,306 | Hallowell | July 10, 1945 |
| 2,495,587 | Magowan | Jan. 24, 1950 |
| 2,550,920 | Gilbert | May 1, 1951 |
| 2,915,201 | Calehuff | Dec. 1, 1959 |
| 3,040,909 | Burnett | June 26, 1962 |